UNITED STATES PATENT OFFICE.

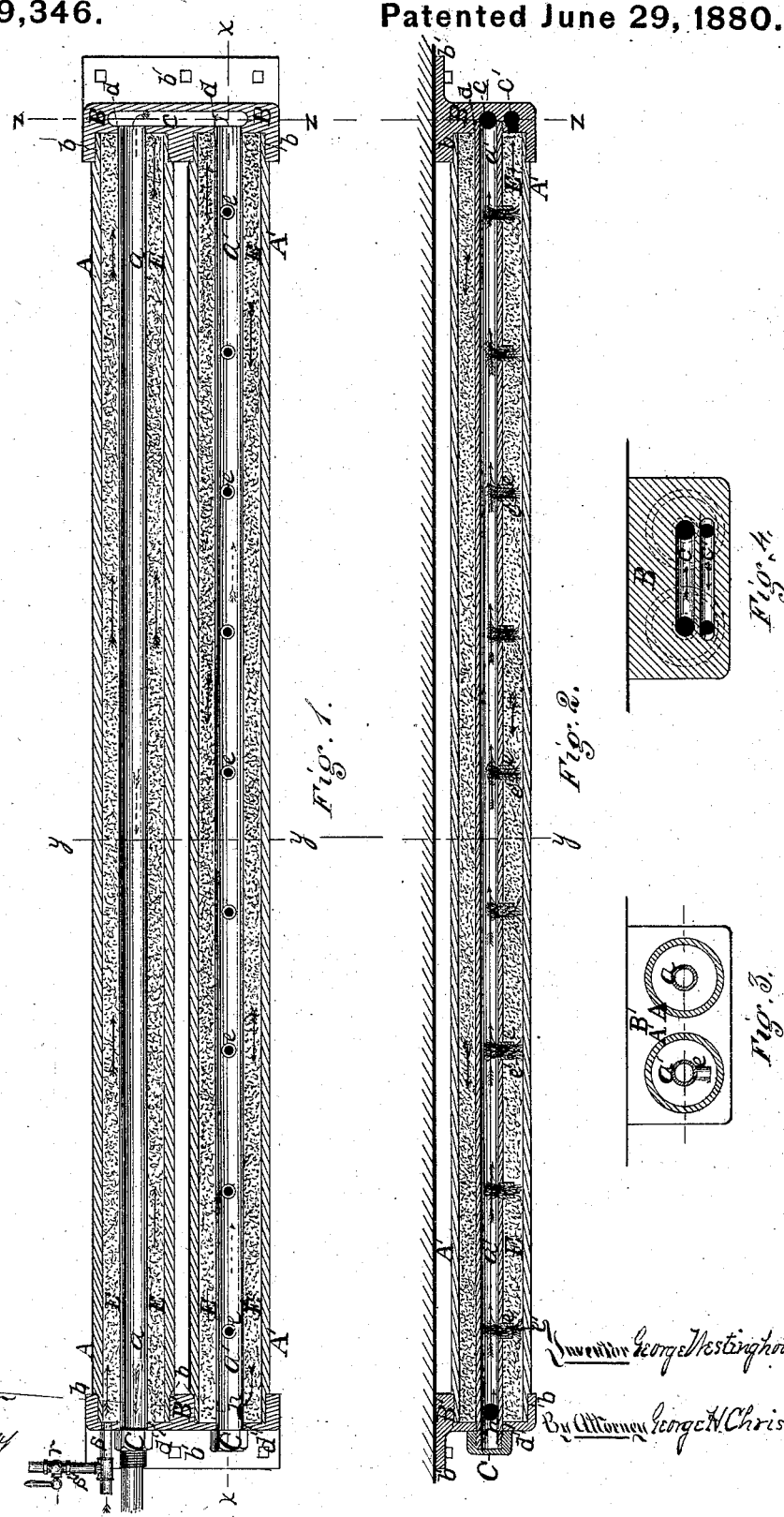

GEORGE WESTINGHOUSE, JR., OF PITTSBURG, PENNSYLVANIA.

CARBURETER.

SPECIFICATION forming part of Letters Patent No. 229,346, dated June 29, 1880.

Application filed February 26, 1880.

*To all whom it may concern:*

Be it known that I, GEORGE WESTINGHOUSE, Jr., of Pittsburg, county of Allegheny, State of Pennsylvania, have invented or discovered a new and useful Improvement in Carbureters, (Case A;) and I do hereby declare the following to be a full, clear, concise, and exact description thereof, reference being had to the accompanying drawings, making a part of this specification, in which—like letters indicating like parts—

Figure 1 is a horizontal sectional view, from the under side, of my improved carbureter. Fig. 2 is a vertical sectional view in the plane of the line x x, Fig. 1. Fig. 3 shows a transverse section taken in the plane of the line y y, and Fig. 4 is a similar view in the plane of the line z z.

My invention relates to apparatus for carbureting air for illuminating purposes; and it consists in a combination and arrangement of inner and outer tubes having communication in such way that the air to be charged with vapor is made to pass through the combined length of the tubes, and during a considerable part of its passage is brought in contact with a hydrocarbon held in an absorbent, and is thereby charged with hydrocarbon gas or vapor.

This apparatus is constructed and operated as follows: Two tubes, A A'—say some six inches in diameter, and from six to eight feet in length, more or less—are provided and their ends are turned true and smooth, so as to fit tightly in corresponding sockets b, made in the adjacent faces of two end caps or castings, B B'. These caps serve to connect and support the tubes, and they may be fastened by flanges b' to the bottom of a car or other desired support.

In the cap B are made two passages, c c', the passage c' affording communication between the tubes A A', and the passage c affording communication between two pipes, a a', which are inclosed within the tubes. The ends of these pipes adjacent to cap B are screwed firmly into threaded sockets d in the cap, into which sockets the passage c opens. The other ends of these pipes pass through holes d' made through cap B'. The pipes are thus supported within the tubes, and in or nearly in the lines of their respective centers.

Nuts C C are fitted on the protruding ends of pipes a a', and by screwing these down the two caps B B' are clamped tightly against the ends of tubes A A', and tight joints secured at such ends; or by unscrewing the nuts the cap B' may be removed for filling the tubes with absorbent material, or other purposes, as presently described. These nuts C also serve to close tightly the holes d', and, if desired, any suitable packing may be placed under the nuts. These features of construction, by which I clamp the caps upon the tubes by means of the pipes and nuts, I consider of great importance, both as a matter of convenience and as securing tight joints in the apparatus. If desired, any suitable packing may be employed at the connections b, in addition to the close-fitting sockets shown.

In the pipe a' are fitted a number of short tubes, e, extending downward, and within these tubes is arranged wicking e', which extends from the interior of the pipe into the space between tube A' and pipe a'. I prefer to fill these short tubes with the wicking, and thus practically to close them, and allow but little, if any, passage through them, except as hydrocarbon liquid may be conducted and absorbed by the wicking.

The space between the pipes and tubes is filled with material E, such as sponge, sawdust, coke, pumice-stone, or other well-known material adapted to absorb a considerable quantity of liquid hydrocarbon, such as is commonly used in carbureters. This filling may be done by removing cap B', or, when fitting up the apparatus, before the cap is put in place.

A free opening, n, in the side of pipe a', at its end adjacent to cap B', gives passage for air from tube A to the pipe.

The end of pipe a protruding through cap B' communicates by suitable connections with the burners; also, a supply-pipe, s, with branch s', passes through cap B' and opens into tube A. In the branch s' is fitted a stop-cock, r, which opens and closes the passage through the same.

The carbureter is charged for use by supplying fluid hydrocarbon through the branch s' in such quantities as will be absorbed by the material E and not leave free liquid within the tubes. This may be done either while the apparatus is in use or in anticipation of use. When sufficiently charged the cock $r$ is closed. Air is supplied, through pipe $s$ under uniform pressure, from any suitable source, as a pump or fan or the brake-pipes of a train. Air thus supplied passes through the body of the saturated material E throughout the length of tube A, and by passage $c'$ to and through tube A' and the saturated material therein, and passing through opening $n$, it returns through pipe $a'$, passage $c$, and pipe $a$, and thence to the burners. In passing through pipe $a'$ the air flows over and around the free ends of the saturated wicking $e'$. By this long passage through and continued contact with the material E and the wicking, the air becomes well charged or mingled with the vapors of the liquid, and is admirably fitted or prepared for burning.

Care should be taken in making this apparatus that the passages $c$ and $c'$ and opening $n$ are of sufficient size to allow the requisite amount of air to pass through the tubes and pipes, and also that the passage $c'$ is of proper form and position to allow passage for the liquid from tube A to A'; and to this end I prefer to arrange this passage near the bottom or lowest level of these tubes and under the passage $c$.

It is obvious that the number of pipes and tubes may be indefinitely increased in this apparatus by properly arranging the communicating passages, and the capacity of the apparatus be thereby increased; also, that the liquid may be supplied to the tubes through a separate pipe or pipes, or equivalent opening in the tubes, instead of through the branch pipes $s'$.

If at any time it is desired to renew the wicking $e'$ or absorbing material E the apparatus may readily be taken apart for this purpose by removing the cap B'.

By making the pipes and tubes of considerable length, as compared with their diameters, and causing all the air to pass successively through their lengths, I secure several advantages—as, for example, a thorough and uniform mingling or charging of the air with vapor is assured by its long contact with the absorbent material, and also by causing all the air to move with equal, or nearly equal, and uniform velocity through the apparatus and under substantially the same conditions. This uniformity of treatment of the air secures a uniform flame or light at the burners, free from those variations in intensity or brightness which is so common and objectionable in this class of lights, and which is largely due to the unequal treatment and consequent unequal charging of the air in such carbureters; also, by arranging the carbureter in the form shown I adapt it especially for use in car-lighting, for which I have especially designed it. In such use I place the apparatus described between the floor and lining, under the sill of the car, and the space in which it is inclosed opens by pipes into the interior of the car, such pipe-openings being at different heights, so as to cause a circulation of air. I thus secure substantially the same temperature at the carbureter as at the burners, which is desirable in order to secure the best results; also, care being taken to charge no more hydrocarbon liquid into the tubes A A' than will be absorbed by the material E, there will be no danger of getting such liquid into the pipes leading to the burners by the unsteady motion of the car.

It is obvious that the wicking $e'$ and tubes $e$ may be omitted from pipe $a'$, and the desired amount or extent of carbureting of the air be secured by increasing the length of the tubes and pipes, and thus increase the exposure of the air to the hydrocarbon contained in the absorbent E, and such modifications I consider as coming within my invention.

I am aware that pipes have been arranged in a carbureter and so connected that air was compelled to traverse their combined length; but I am not aware that such an arrangement has been made within a series of similar pipes or tubes with a filling of absorbent matter in the space between the inner and outer pipes, leaving a free passage through the inner pipes, as I have described herein.

I claim herein as my invention—

1. In a carbureter, the combination of exterior tubes, A A', and interior pipes, $a\ a'$, end cap or casting, B, having smooth sockets for receiving one end of the tubes and threaded sockets for one end of the pipes, cap B', having sockets for the other ends of the tubes and holes for the pipes, and nuts C, substantially as and for the purposes set forth.

2. In a carbureter, the combination of outer tubes, A A', and inner pipes, arranged as shown, with absorbent E between the same, leaving a free passage through the inner pipes, end caps, B B', having passages $c\ c'$ between the pipes and tubes, respectively, at the end opposite the supply, the pipe $a'$, having opening $n$ at its end adjacent to the supply, wicking $e'$, arranged along the length of pipe $a'$, and supply-pipe $s$, substantially as set forth.

In testimony whereof I have hereunto set my hand.

GEORGE WESTINGHOUSE, JR.

Witnesses:
R. H. WHITTLESEY,
C. L. PARKER.